United States Patent Office 3,201,484
Patented Aug. 17, 1965

3,201,484
REACTIONS OF CONJUGATED DIENES
William R. Myers, Dunbar and Roy L. Pruett, Charleston, W. Va., assignors to Union Carbide Corporation, a corporation of New York
No Drawing. Filed Oct. 16, 1962, Ser. No. 230,987
33 Claims. (Cl. 260—666)

The present application is a continuation-in-part of application Serial No. 40,524, by R. L. Pruett and W. R. Myers, filed on July 5, 1960, now abandoned.

This invention relates to the reaction of conjugated dienes in the presence of an organometallic compound. In one aspect, the invention relates to the inhibition of polymer formation in Diels-Alder reactions. In another aspect, the invention relates to a process for the production of useful dimers of conjugated dienes.

Valuable olefinic compounds are obtained by means of the Diels-Alder reaction. The term "Diels-Alder" characterizes the addition reaction of an olefin having an activated double bond (a dienophile) with a conjugated diene and such term encompasses dimerization reactions of conjugated dienes, i.e., reactions wherein the conjugated diene functions as both diene and dienophile. The usual products of Diels-Alder reactions are compounds containing a mono-olefinically unsaturated six-membered ring, said ring being formed by the 1,4-addition of the activated double bond of the dienophile to the conjugated diene. However, in Diels-Alder reactions wherein both diene and dienophile contain conjugated double bonds, i.e., in the dimerization of a conjugated diene, other dimeric addition products are also obtained. For instance, the dimerization of 1,3-butadiene yields 4-vinylcyclohexene as well as small quantities of 1,2-divinylcyclobutane and cyclooctadiene-1,5. Therefore, the term "Diels-Alder addition product(s)," as used in the specification and appended claims, is deemed to encompass not only true Diels-Alder products, i.e., products formed by the 1,4-addition of the activated double bond of the dienophile to the conjugated diene, but also other addition products formed by the reaction of one molecule of dienophile with one molecule of conjugated diene. Consequently, the term "Diels-Alder reaction(s)" is used to denote the reaction of a conjugated diene with a dienophile under operative conditions whereby Diels-Alder addition products as hereinbefore defined are produced.

The benefits of the extremely valuable Diels-Alder reactions are considerably reduced due to the tendency of the diene to form undesirable high polymers, thereby reducing both the yield and the efficiency of the reaction. Various polymerization inhibitors, such as hydroquinone, di-tertiary-butyl-para-cresol, and acetylenedicarboxylic acid, have been employed to lessen the degree of polymerization of the dienic reactant but polymerization still occurred to a considerable extent. For example, the highest efficiency obtained for the formation of 4-vinylcyclohexene by the dimerization of 1,3-butadiene in the presence of previously known inhibitors was about 70 percent, with 30 percent of the final mixture appearing as relatively high molecular weight oils having relatively no commercial value.

Another disadvantage of Diels-Alder dimerization reactions is that one dimer is obtained almost exclusively. For instance, the dimerization of 1,3-butadiene yields almost exclusively 4-vinylcyclohexene, with only very small amounts of cyclooctadiene-1,5 and 1,2-divinylcyclobutane being found in the reaction product. Various catalysts have been described in the literature for the selective dimerization of 1,3-butadiene to unusual and useful dimers; however, processes utilizing such catalysts suffer from one or more disadvantages, such as high catalyst toxicity, lengthly reaction periods, formation of appreciable quantities of cyclododecatriene and higher polymers, and the like.

Accordingly, one or more of the following objects will be achieved by the practice of the invention.

It is an object of the invention to inhibit the formation of undesirable polymers in Diels-Alder reactions. It is another object of the invention to provide a novel process for the selective dimerization of conjugated dienes to produce useful dimers. It is a further object of the invention to provide a novel process for the selective dimerization of conjugated dienes which avoids one or more of the disadvantages of the prior art. Other objects will become apparent to those skilled in the art in the light of the instant specification.

In a broad aspect, the present invention is directed to a novel process which comprises conducting a Diels-Alder reaction in the presence of from about 0.001 to about 25 weight percent, based on the weight of the reactant(s), of a cyclopentadienyl nickel or cyclopentadienyl cobalt compound capable of forming a homogeneous phase with the liquid phase reaction component(s), at a temperature of from about −10° C. to about 270° C., and for a period of time sufficient to produce a Diels-Alder addition product. The cyclopentadienyl metal compounds which are contemplated in the instant invention are characterized by the presence of at least one cyclopentadienyl radical which is pi-bonded to the metal atom. The above compounds can be further characterized as containing in their structure the following group:

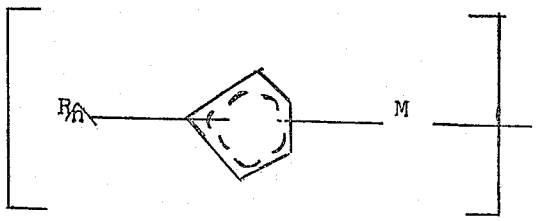

wherein M is nickel or cobalt symmetrically bonded to the cyclopentadienyl group and wherein each of the carbon atoms of the cyclopentadienyl nucleus is equally unsaturated; wherein R is alkyl or aryl; and wherein $n$ is an integer having a value of from 0 to 3. It is pointed out that the essential entity of the cyclopentadienyl metal compound is the cyclopentadienyl ring which is symmetrically pi-bonded to the metal atom. Therefore a wide variety of cyclopentadienyl compounds of nickel and cobalt can be employed to provide the essential entity providing said compounds form a homogeneous phase with the liquid phase reaction components under the operative conditions of the process. A solvent inert with respect to the reactant(s) and product(s) can be employed to bring about the required homogeneity. The additional moieties which can be bonded to the metal atom can be selected from a large group of ions and neutral ligands. Illustrative ions or charged moieties include, for instance, the halide ions; the hydride ion; the cyclopentadienylide anions; the π-allyl groupings; the enolates such as the enolates of beta-dicarbonyl compounds, e.g., acetylacetonates and the like; the anions of acidic oxides of carbon (carboxylate, carbonate, etc.), nitrogen (nitrate, nitrile, etc.), phosphorus (phosphate, phosphite, etc.), bismuth (bismuthate, etc.), aluminum (aluminate, etc.), silicon (silicate, etc.), sulfur (sulfate, sulfite, etc.), molybdenum (molybdates, etc.), and the like, in which one valence of the central atom of the acidic oxide may be attached to the metal and/or in which one of the oxygen atoms may be attached to the metal and the like. In addition, exemplary neutral ligands or neutral moieties which are contemplated include, among others, the olefins; the acetylenes; the acetylenic olefins; the aromatic compounds, e.g., benzene, diphenyl, and the like; carbon monoxide; nitric oxide; the basic nitrogen compounds, e.g., ammonia, the anilines, pyridines, dipyridines, amines, imines, amides, imides, ureas, oximes, nitriles, hydroxamic acids, amino acids, and the like; the organic ethers, e.g., dimethyl ether of diethylene glycol, dioxane, tetrahydrofuran, furan, diallyl ether, and the like; the phosphines, e.g. phosphine, the alkylphosphines, the arylphosphines, the alkarylphosphines, and the like, and analogous compounds of antimony, arsenic, and bismuth; the phosphites, e.g., the alkyl-, aryl-, alkarylphosphites, and the like; the phosphine oxides; the phosphorus halides; the phosphor oxyhalides; the sulfides, e.g., the alkyl-, aryl-, alkarylsulfides, and the like; the cyclic sulfides; the unsaturated sulfides; the sulfoxides, e.g., aryl-, alkarylsulfoxides, and the like.

Specific cyclopentadienyl compounds illustrative of the above include, for example, dicyclopentadienyl cobalt, bis (methylcyclopentadienyl) cobalt, cyclopentadienyl cobalt 1,3-cyclopentadiene, cyclopentadienyl cobalt 1,3-butadiene, cyclopentadienyl cobalt 1-benzoylcyclopentadiene-1, 3, cyclopentadienyl cobalt dicarbonyl, dicyclopentadienyl nickel, bis (methylcyclopentadienyl) nickel, cyclopentadienyl nickel nitrosyl, bis(phenylcyclopentadienyl)-nickel, and the like. The preparation of typical compounds falling within the above definition is documented in "Organometallic Compounds," by G. E. Coates, John Wiley and Sons, Inc., New York (1956).

It has unexpectedly been found that when a conjugated diene is contacted with any of the aforementioned compounds under conditions which would normally cause polymerization of said diene, the formation of polymers higher than the dimer of the diene is materially reduced. It has also been found that the dimers of the conjugated diene which are formed under the reaction conditions employed contain substantially higher quantities of the 1,2-divinylcyclobutane dimer than would be obtained under the same reaction conditions but in the absence of the cyclopentadienyl metal compound. For example, the dimerization of 1,3-butadiene in contact with the cyclopentadienyl metal compounds of the invention yields a higher product ratio of 1,2-divinylcyclobutane to 4-vinylcyclohexene than would be obtained under the same reaction conditions but in the absence of the cyclopentadienyl metal compound. Various factors, such as the particular cyclopentadienyl metal compound employed, the concentration of said cyclopentadienyl metal compound, the reaction temperature, and the like, determine the selectivity of the reaction.

The conjugated dienes which can be employed as reactants in the novel process are characterized by the presence therein of a

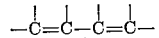

unit and preferably contain from 4 to 12 carbon atoms. Illustrative dienes are, for example, the conjugated alkadienes, such as 1,3-butadiene, isoprene, 1,3-pentadiene, 2,3-dimethylbutadiene-1,3, 1,3-hexadiene, 2,4-octadiene, 2-methylpentadiene-1,3, and the like; and the alkoxy-substituted conjugated alkadienes, such as 2-methoxybutadiene-1,3, 2,3-dimethoxybutadiene-1,3, 2-methoxy-3-ethoxypentadiene-1,3, and the like. The conjugated alkadienes which contain from 4 to 8 carbon atoms are highly preferred.

The second reactant (dienophile) which may be employed in the Diels-Alder reaction of the invention contains carbon to carbon double or triple bond conjugated with an electron acceptor. Some of the most commonly employed dienophiles can be represented by the following formula:

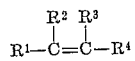

wherein $R^1$ is a radical activating the double bond, e.g., a radical containing double bonds or oxygen. Examples of such radicals are alkenyl, e.g., vinyl, propenyl, butenyl, pentenyl, and the like; aryl, e.g., phenyl, naphthyl, and the like; aralkyl, e.g., tolyl, xylyl, ethylphenyl, and the like; alkoxy, e.g., methoxy, ethoxy, propoxy, butoxy, pentoxy, and the like; acyl, e.g., acetyl, propionyl, butyryl, and the like; alkanoyloxy, e.g., acetate, propionate, butyrate, and the like; and the aldehydric radical; and wherein each $R^2$, $R^3$ and $R^4$, individually, can be hydrogen; lower alkyl, e.g., methyl, ethyl, propyl, butyl, amyl, and the like; as well as the aforementioned alkenyl, aryl, aralkyl, alkoxy, acyl, alkanoyloxy, and aldehyde radicals, Additional compounds which can be employed as dienophiles in the process of the invention and which are not characterized by the above formula are adequately described in the literature.

Illustrative dienophiles include propylene, 1,3-butadiene, styrene, vinyl chloride, vinyl acetate, crotonaldehyde, methyl vinyl ether, methyl vinyl ketone, vinylnaphthalene, cyclohexene, 4-vinylcyclohexene, and the like.

The concentration of the cyclopentadienyl metal compound in the reaction mixture is not critical. In general, a concentration as low as about 0.001 weight percent, based on the weight of the reactant(s), has been found to inhibit the formation of polymers of the dienic reactant. For optimum results, the particular cyclopentadienyl metal compound employed, the reactant(s) employed, the operative conditions under which the reaction is conducted, the particular product(s) desired, and other factors, will largely determine the desired concentration.

The reaction preferably is effected in the liquid phase, and to this extent sufficient pressure is employed to maintain an essentially liquid phase reaction mixture. In general, pressures in the range of from about 1, and lower, to about 100 atmospheres, and higher, can be employed. Preferably, the reaction is carried out under superatmospheric pressures, for example, of from about 6 to about 60 atmospheres.

Since the cyclopentadienyl metal compounds of the invention are substantially soluble in the liquid conjugated diene, they generally form a homogeneous phase with the dienic reactant under the operative conditions of the process. If necessary, a solvent which is inert with respect to the reactants and product(s) may be employed to bring about the required homogeneity. Illustrative of the inert normally-liquid organic solvents are the aromatic hydrocarbons, e.g., benzene, toluene, and the like; the saturated aliphatic hydrocarbons, e.g., hexane, heptane, and the like, and saturated aliphatic and cycloaliphatic ethers, e.g., diethyl ether, dibutyl ether, dioxane tetrahydrofuran, and the like.

The reaction, as indicated previously, can be conducted over a wide temperature range. Depending upon various factors such as the nature and the concentration of the cyclopentadienyl metal compound employed, the reactant(s) employed, the particular product(s) desired, and the like, the reaction temperature may be as low as about −10° C. and as high as about 270° C. Reaction temperatures in the range of from about 50° C. to about 220° C. provide reasonable reaction rates and therefore are preferred.

In general, the reaction time will vary depending on the operative temperature, the particular cyclopentadienyl metal compound and the concentration employed, the particular reactant(s), and other factors. It has been observed that desirable results may be obtained by conducting the reaction for a period of time ranging from several minutes to several hours, e.g., from about 5 minutes to about 20 hours, or higher.

It is preferred to operate the novel process under an inert atmosphere to prevent oxidation of the cyclopentadienyl metal compound. Illustrative inert gases which will not react with said compounds are, for example, nitrogen, helium, argon, and the like. Nitrogen is highly preferred.

The novel process may be executed in a batch, semicontinuous, or continuous fashion. The reaction vessel can be a glass vessel, steel autoclave, elongated metallic tube, or other equipment and material employed in the art provided that such equipment is able to withstand the reaction pressures and that the cyclopentadienyl metal compound employed is not sensitive to this material of construction. The order of addition of reactant(s) does not appear to be critical. A suitable procedure is to dissolve the desired amount of cyclopentadienyl metal compound in the liquid diene or diene-dienophile mixture and to introduce the resulting admixture into the reaction zone under an inert atmosphere.

The unreacted starting material(s) and the product(s) which are formed can be recovered from the resulting reaction product mixture by conventional techniques such as by distillation under reduced pressure.

The first preferred embodiment of the invention is directed to a process which comprises conducting a Diels-Alder reaction in the presence of from about 0.01 to about 5 weight percent, based on the weight of the reactant(s), of a bis(cyclopentadienyl) cobalt compound capable of forming a homogeneous phase with the liquid phase reaction components, at a temperature of from about −10° C. to about 270° C., and for a period of time sufficient to produce a Diels-Alder addition product. It has been observed that while, in general, the cyclopentadienyl metal compounds set forth in the broad aspects of the invention materially reduce the formation of undesirable high polymers of the dienic reactant, bis(cyclopentadienyl) cobalt compounds are preferred among said compounds. For example, the dimerization of 1,3-butadiene in the presence of dicyclopentadienyl cobalt resulted in conversions of up to 82 percent and in reaction efficiencies of over 90 percent. The formation of higher polymers was observed to be less than 5 percent. It is readily apparent, therefore, that the formation of solid polymers is minimized or essentially eliminated when Diels-Alder reactions are conducted according to the process of this embodiment.

The compounds that are employed in this first preferred embodiment are various bis(cyclopentadienyl)cobalt compounds which can be represented by the following structural formula:

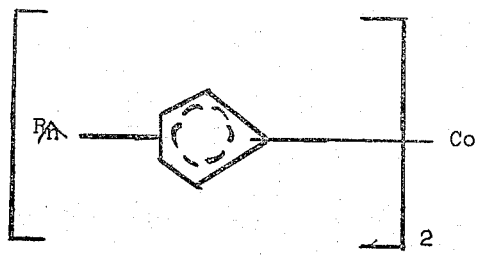

wherein R is an alkyl or aryl radical and wherein $n$ is an integer having a value of 0 to 3. Illustrative compounds include, for example, dicyclopentadienyl cobalt, bis(methylcyclopentadienyl) cobalt, bis(ethylcyclopentadienyl) cobalt, bis(isopropylcyclopentadienyl) cobalt, bis-(n-propylcyclopentadienyl) cobalt, bis(n-butylcyclopentadienyl) cobalt, bis(isobutylcyclopentadienyl) cobalt, bis(1-methylpropylcyclopentadienyl) cobalt, bis(2-methylpropylcyclopentadienyl) cobalt, bis(n-pentadienylcyclopentadienyl) cobalt, bis(1-ethylpropylcyclopentadienyl) cobalt, bis(2-methylbutylcyclopentadienyl) cobalt, bis(3-methylbutylcyclopentadienyl) cobalt, bis(1,1-dimethylpropylcyclopentadienyl) cobalt, bis(2,2-dimethylpropylcyclopentadienyl) cobalt, bis(1,2-dimethylpropylcyclopentadienyl) cobalt, bis(1-ethylpropylcyclopentadienyl) cobalt, the bis(hexylcyclopentadienyl) cobalts, the bis-(heptylcyclopentadienyl) cobalts, bis(phenylcyclopentadienyl) cobalt, and the like. Dicyclopentadienyl cobalt and bis(methylcyclopentadienyl) cobalt are highly preferred.

The above compounds can be prepared by reacting an organic compound which contains a cyclopentadienyl ring and a replaceable hydrogen on the methylene carbon atom of said ring, with an alkyl Grignard reactant, such as ethylmagnesium bromide, to form a cyclopentadienyl Grignard compound which is then reacted with a cobalt halide, such as cobaltous bromide, in an inert normally-liquid organic vehicle, such as ethyl ether, benzene, or toluene. The resulting reaction product mixture is hydrolyzed with dilute hydrochloric acid or hydrobromic acid, whereby a bis(cyclopentadienyl) cobalt (III) halide is formed. The bis(cyclopentadienyl) cobalt can be formed by passing a dilute aqueous acidic solution containing said halide through a Jones reductor (Zn–HCL) whereby said halide is reduced to the bis(cyclopentadienyl) cobalt compound. The resulting bis-(cyclopentadienyl) cobalt can be recovered from the reduction by washing the contents of the reductor with an organic medium which is a solvent for the bis(cyclopentadienyl) cobalt compound, such as benzene. The solvent is then evaporated, leaving the crude product which can be purified by sublimation at a temperature of from about 80° C. to about 100° C., and at a pressure of about 1 mm. of mercury.

Since the bis(cyclopentadienyl) cobalt compounds are readily oxidizable, the entire preparation and storage of said compound should be conducted under an inert atmosphere, preferably under nitrogen.

The organic compounds which contain a cyclopentadienyl ring that can be used to prepare the bis(cyclopentadienyl) cobalt compounds described supra include, for example, cyclopentadiene; the alkylcyclopentadienes, e.g., methylcyclopentadiene, ethylcyclopentadiene, n-propylcyclopentadiene, isopropylcyclopentadiene, n-butylcyclopentodiene, isobutylcyclopentadiene, dimethylcyclopentadiene, and the like; and the arylcyclopentadienes, e.g., phenylcyclopentadiene, and the like.

The bis(cyclopentadienyl) cobalt compounds described supra can be employed as polymerization inhibitors in any Diels-Alder reaction. However, it is not preferred to employ them when olefinic acids or olefins containing reactive halogen atoms, such as acrylic acid or vinylidene chloride, are used as reactants since the bis (cyclopentadienyl) cobalt compounds tend to react therewith. They can be employed successfully, however, when compounds containing unreactive halogen atoms, such as vinyl chloride, are used as reactants.

Among the conjugated dienic reactants which can be employed in the Diels-Alder reaction are the conjugated dienes set forth in the broad aspect of the invention. Cyclic conjugated dienes, such as cyclopentadiene, methylcyclopentadiene, and the like, are also operable. The literature very adequately describes numerous additional conjugated dienes which can be used as the dienic reactant in the Diels-Alder reaction.

The bis(cyclopentadienyl) cobalt compounds are employed in the novel process of the preferred embodiment in a concentration in the range of from about 0.01 to about 5 weight percent, based on the weight of the reactant(s). A concentration of from about 0.05 to about 1.0 weight percent is highly preferred.

Diels-Alder reactions wherein the dienophile has activating groups such as carbonyl and nitrile groups generally proceed readily at about room temperatures, whereas those wherein an olefinic hydrocarbon is used as the dienophile generally require reaction temperatures above about 100° C. for reasonable reaction rates. Since it is at such higher temperatures that the rate of formation of undesirable high polymers of the dienic reactant is particularly significant, the novel process is especially beneficial when applied to Diels-Alder reactions which employ the latter type of reactants. Therefore, it is preferred to use the bis(cyclopentadienyl) cobalt of the novel embodiment in Diels-Alder reactions which require temperatures of from about 100° C. to about 195° C. to attain reasonable reaction rates. Highly preferred reaction temperatures are in the range of from about 180° C. to about 190° C.

In general, reaction conditions substantially similar to those set forth in the broad aspect of the invention are operative in the Diels-Alder process of the preferred embodiment. Preferred operative conditions are largely determined by the nature of the dienic reactant, the use and nature of the dienophile, and the like.

The second preferred embodiment of the invention is directed to a process which comprises contacting a conjugated diene with from about 0.5 to about 25 weight percent, based on the weight of the conjugated diene, of a cyclopentadienyl compound of cobalt or nickel capable of forming a homogeneous phase with the liquid phase reaction component(s), at a temperature in the range of from about 100° C. to about 220° C., and for a period of time sufficient to produce a 1,2-divinylcyclobutane product. It has been found that the dimers formed under the above reaction conditions contain substantially higher amounts of the 1,2-divinylcyclobutane dimer than would be obtained from a non-catalyzed dimerization. For instance, the operative examples contained in this specification disclose that when 1,3-butadiene is dimerized according to the novel process of the present embodiment up to 25 weight percent and higher, of the dimeric products consist of 1,2-divinylcyclobutane.

The cyclopentadienyl metal compounds which are contemplated in the process of the present embodiment have been set forth in the broad aspect of the invention. Particularly preferred cyclopentadienyl compounds are those wherein the metal atom is additionally bonded to a second cyclopentadienyl group or to conjugated diene ligand. Illustrative cyclopentadienyl metal compounds include, for example, the bis(cyclopentadienyl)-nickel compounds, e.g., dicyclopentadienyl nickel, bis(lower alkyl cyclopentadienyl) nickel, bis(methylcyclopentadienyl) nickel, bis(ethylcyclopentadienyl)nickel, bis(arylcyclopentadienyl) nickel, bis(phenylcyclopentadienyl)nickel, and the like; the bis(cyclopentadienyl) cobalt compounds, e.g., dicyclopentadienyl cobalt, bis(lower alkyl cyclopentadienyl) cobalt, bis(methylcyclopentadienyl) cobalt, bis(ethylcyclopentadienyl)cobalt, bis(arylcyclopentadienyl) cobalt, bis(phenylcyclopentadienyl)cobalt, and the like; the (cyclopentadienyl)nickel(conjugated diene) compounds, e.g., cyclopentadienyl nickel alkadiene, cyclopentadienyl nickel 1,3-butadiene, cyclopentadienyl nickel, 1,3-pentadiene, methylcyclopentadienyl nickel, 1,3-butadiene, cyclopentadienyl nickel 1,3-cyclopentadiene, and the like; and the (cyclopentadienyl) cobalt (conjugated diene) compounds, e.g., cyclopentadienyl cobalt alkadiene, cyclopentadienyl cobalt 1,3-butadiene, cyclopentadienyl cobalt 1,3-pentadiene, methylcyclopentadienyl cobalt 1,3-butadiene, cyclopentadienyl cobalt 1,3-cyclopentadiene, and the like.

The cyclopentadienyl metal compounds are preferably employed in the novel process of the present embodiment in a concentration in the range of from about 0.5 to about 25 weight percent, based on the weight of the dienic reactant. A concentration in the range of from about 2 to about 7 percent is highly preferred.

The dimerization is preferably conducted at a temperature in the range of from about 100° C. to about 220° C. A temperature in the range of from about 130° C. to about 170° C. is highly preferred.

In general, the reaction time will vary depending on the operative temperature, the nature of the conjugated diene employed, the particular cyclopentadienyl metal compound and the concentration employed, and other factors. In view of the variables noted above, the reaction is conducted for a period of time sufficient to dimerize the dienic reactant. It has been observed that desirable results can be obtained by conducting the reaction for a period of time ranging from several minutes to several hours, or longer. In general, a reaction time in the range of from about 0.5 hour, and lower, to about 24 hours, and higher, is suitable.

The remaining reaction conditions are within the operative ranges set forth supra in the broad aspect of the invention. Preferred operative conditions are largely determined by the nature of the dienic reactant, the nature and concentration of the cyclopentadienyl metal compound, and the like, and may be easily ascertained by one skilled in the art in the light of the instant specification.

The Diels-Alder addition products which are obtained in accordance with practice of the present invention possess utility in the preparation of alcohols, ketones, acids, amines, epoxides, and various other derivatives. In addition, the products of the present invention can be employed as a monomeric source in the preparation of useful polymers.

The following examples are illustrative:

*Example 1*

To a heavy-walled glass tube there were charged 25 grams of 1,3-butadiene and 1.25 grams of dicyclopentadienyl nickel. The tube was sealed and heated to about 130° C. for a period of about 18 hours. Thereafter, the tube and the resulting reaction product mixture were cooled in Dry Ice. The reaction product mixture was removed from the tube and flash distilled. There was obtained 9 grams of distillate which had a boiling point of 125° C. at atmospheric pressure. Vapor phase chromatography revealed that the distillate was composed of 13 weight percent 1,2-divinylcyclobutane, 82 weight percent 4-vinylcyclohexene, and 5 weight percent unreacted 1,3-butadiene.

*Example 2*

To a 500 ml. pressure vessel there were charged under a nitrogen atmosphere, 142 grams of 1,3-butadiene and 10 grams of cyclopentadienyl cobalt 1,3-butadiene, $$C_5H_5CoC_4H_6$$

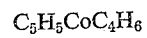

The vessel and contents were placed on a platform rocker and heated, while rocking, to a temperature of about 125° C. Heating and rocking were continued for a period of 15 hours.

The vessel and contents were cooled to room temperature, i.e., about 24° C., the unreacted 1,3-butadiene was vented, and the liquid reaction product mixture (46 grams) was flash distilled under reduced pressure. Vapor phase chromatography revealed that the distillate consisted essentially of dimeric products and contained about 25 weight percent of 1,2-divinylcyclobutane.

*Example 3*

To a 500 ml. pressure vessel there were charged 120 grams of 1,3-butadiene and 3.0 grams of cyclopentadienyl nickel nitrosyl. The vessel and contents were placed on a platform rocker and heated, while rocking, to a temperature of about 170° C. Heating and rocking were continued for a period of 4 hours.

The vessel and contents were cooled to room temperature, i.e., about 24° C., and the unreacted 1,3-butadiene was vented. The liquid reaction product mixture then was flash distilled under reduced pressure to yield 87 grams of distillate. Vapor phase chromatography revealed that the distillate consisted essentially of dimeric products and contained about 10 weight percent of 1,2-divinylcyclobutane.

Example 4

To a 3-liter pressure vessel there was charged 1006 grams (1450 ml.) of 1,3-butadiene. Air was purged from the vessel with a nitrogen stream and 1.0 gram of freshly sublimed dicyclopentadienyl cobalt was added under a nitrogen atmosphere. The resulting mixture was heated at a temperature of 190+5° C. for a period of 3 hours while agitating the mixture by rocking the vessel. A maximum pressure of 950 p.s.i.g. was obtained which slowly decreased to 250 p.s.i.g. at the end of the 3 hour reaction period. After cooling to room temperature, i.e., about 24° C., the reaction product mixture, which weighed 953 grams, was removed from the reaction vessel and disstilled at reduced pressure, whereby 739 grams of 4-vinylcyclohexene were recovered, amounting to a yield of 73 percent, based upon the 1,3-butadiene charged. The conversion of 1,3-butadiene to its dimer and higher polymers was 82.4 percent. The efficiency of the reaction to 4-vinylcyclohexene was 89.2 percent.

Example 5

Butadiene and 2 weight percent solution of dicyclopentadienyl cobalt in tetralin were fed continuously to a tubular reactor, constructed of four sections of one-inch inside diameter stainless-steel tubing that were jacketed for heat control. The total reactor volume was 0.495 cubic foot. 1,3-butadiene was fed to the reactor at a rate of 5.6 pounds per hour and the dicyclopentadienyl cobalt-tetralin solution was fed to the reactor at a rate of 112 cc. per hour, resulting in a concentration of 0.088 weight percent dicyclopentadienyl cobalt in the 1,3-butadiene. The reactor temperature was in the range of 184–189° C. throughout the run. The reactants were agitated within the reactor by means of an internal mixing pump of 30–40 gallons per hour capacity. The remainder of the effluent was withdrawn as a product stream. The reaction was continued for 65 hours before plugging of the reactor with polymer occurred. Where this process is conducted in the absence of the dicyclopentadienyl cobalt compounds employed as polymerization inhibitors in the process of this embodiment of the invention, the process must be shut down after only 3 to 5 hours. The product collected over this interval weighed 312 pounds, of which 225 pounds were 4-vinylcyclohexene. This amounted to a production rate of about 7 pounds of 4-vinylcyclohexene per hour per cubic foot of reactor space. Three-hundred and sixty-six pounds of 1,3-butadiene were charged to the reactor. Thus, the 4-vinylcyclohexene was produced in a 61 percent yield, based upon the 1,3-butadiene charged. The product contained only 5.6 percent of high boiling residues, giving a reaction efficiency of 92 percent. About 6.1 percent of the product stream was unreacted 1,3-butadiene.

Example 6

To a 500-ml. pressure vessel there were charged 104 grams (1 mole) of freshly distilled styrene 107 grams (1.98 moles) of 1,3-butadiene. The air was purged from the vessel with a nitrogen stream and 0.5 gram of dicyclopentadienyl cobalt was added under a nitrogen atmosphere. The reaction mixture was heated at 180±5° C. for 3 hours while agitating the mixture by rocking the pressure vessel. After cooling to room temperature, the reaction product mixture, amounting to 205 grams, was removed from the vessel and distilled under reduced pressure.

The products recovered were 59 grams of 4-vinylcyclohexene, amounting to a yield of 55 percent, based upon the 1,3-butadiene, 39 grams of unreacted styrene, and 51 grams of 1,2,5,6-tetrahydrodiphenyl, amounting to a yield of about 33 percent based on styrene.

The prior art describes the reaction of 104 grams of styrene with 140 cc. of 1,3-butadiene in the presence of 1 gram of acetylene dicarboxylic acid for 14 hours at a temperature of 170° C. The products recovered were 45 grams of 4-vinylcyclohexene, 12 grams of an intermediate cut and 52 grams of tetrahydrodiphenyl [Ber., 71B, 279 (1938)].

Example 7

Using the procedure and apparatus of Example 6, 52 grams (0.5 mole) of freshly distilled styrene, 70 ml. (48.6 grams, 0.9 mole) of 1,3-butadiene and 150 ml. of n-heptane were reacted in the presence of 0.5 gram of dicyclopentadienyl cobalt, under a nitrogen atmosphere and at a temperature of 180±5° C. for 16 hours. After cooling to room temperature, the reaction product mixture was removed from the pressure vessel and distilled.

The products recovered were 31 grams of 4-vinylcyclohexene and 36 grams of tetrahydrodiphenyl, representing a yield of 45.6 percent, based on styrene. The yield of products, based on 1,3-butadiene, was 89 percent. The amount of residue remaining in the pot after distillation was negligible, indicating that very little high polymers had formed.

Example 8

To a 3-liter pressure vessel there were charged 894 grams (16.5 moles) of 1,3-butadiene and 397 grams (2.86 moles) of 95% dicyclopentadiene. The air in the vessel was purged with a nitrogen stream and 1.2 grams of dicyclopentadienyl cobalt was added. The resulting mixture was heated at 180–190° C. for 3 hours while agitating the mixture by rocking the vessel. The initial pressure at this temperature was 525 p.s.i.g. which slowly decreased to 150 p.s.i.g. at the end of the 3 hour reaction period. After cooling to room temperature, the contents were removed from the vessel and distilled under reduced pressure.

The amount of unreacted 1,3-butadiene was 163 grams. The products were 463 grams of 4-vinylcyclohexene, 123 grams of vinylbicycloheptene, 208 grams of bicyclononadiene, and 240 grams of 9-vinyltetracyclododecene-3. High-boiling residues amounted to 93 grams. There are no evidence of the formation of insoluble polymers.

Example 9

To a three-liter pressure vessel there was charged 988 grams of 1,3-butadiene. Air was purged from the vessel with nitrogen and 1.0 gram of bis(methylcyclopentadienyl) cobalt was added. The vessel was sealed and heated at a temperature of 185±5° C. for 3 hours, while agitating the mixture by rocking the vessel. The reaction mixture was then cooled to room temperature, i.e., about 24° C., and the vessel was vented to remove 133 grams of unreacted 1,3-butadiene. The reaction product mixture, which weighed 855 grams, was removed from the vessel and distilled under reduced pressure, whereby 71 grams of 1,3-butadiene and 777 grams of 4-vinylcyclohexene were recovered, amounting to a yield of 4-vinylcyclohexene of about 79 percent. About 7 grams of a higher-boiling residue remained in the pot. Thus, the efficiency of the reaction was about 99 percent.

Example 10

In a similar manner as set forth in Example 9, supra, 1,3-butadiene can be heated at 185±5° C. for 3 hours in the presence of about 0.1 weight percent of bis(phenylcyclopentadienyl) cobalt, based on the weight of 1,3-butadiene, to form 4-vinylcyclohexene in high yields and at high efficiencies.

Although the invention has been illustrated by the preceding examples, the invention is not to be construed as limited by the materials employed in the above examples, but rather the invention encompasses the generic area as hereinbefore disclosed. Various modifications and embodiments of this invention can be made without departing from the spirit and scope thereof.

What is claimed is:

1. A process which comprises conducting a Diels-Alder reaction in the presence of from about 0.001 to about 25 weight percent, based on the weight of the reactants, of a compound selected from the group consisting of cyclopentadienyl nickel compounds and cyclopentadienyl cobalt compounds, said compound being capable of forming a homogeneous phase with the liquid phase reaction components; at a temperature of from about −10° C. to about 270° C.; and for a period of time sufficient to produce a Diels-Alder addition product.

2. The process of claim 1 wherein the temperature is in the range of from about 50° C. to about 220° C.

3. A process which comprises conducting a Diels-Alder reaction in the presence of from about 0.01 to about 5 weight percent, based on the weight of the reactants, of a bis(cyclopentadienyl) cobalt compound capable of forming a homogeneous phase with the liquid phase reaction components, at a temperature of from about −10° C. to about 270° C., and for a period of time sufficient to produce a Diels-Alder addition product.

4. The process of claim 3 wherein the temperature is in the range of from about 100° C. to about 190° C.

5. The process of claim 4 wherein the temperature is in the range of from about 180° C. to about 190° C.

6. A process which comprises contacting a conjugated alkadiene containing from 4 to 12 carbon atoms with from about 0.05 to about 5 weight percent, based on the weight of said alkadiene, of a bis(cyclopentadienyl) cobalt compound capable of forming a homogeneous phase with the liquid phase reaction components; at a temperature in the range of from about 100° C. to about 195° C.; and for a period sufficient to dimerize said alkadiene.

7. The process of claim 6 where the bis(cyclopentadienyl) cobalt compound is dicyclopentadienyl cobalt.

8. The process of claim 6 wherein the bis(cyclopentadienyl) cobalt compound is bis(methylcyclopentadienyl) cobalt.

9. A process which comprises contacting 1,3-butadiene with from about 0.01 to about 5 weight percent, based on the weight of said butadiene, of a bis(cyclopentadienyl) cobalt compound capable of forming a homogeneous phase with the liquid phase at a temperature in the range of from about 100° C. to about 195° C.; and for a period of time sufficient to dimerize said butadiene.

10. The process of claim 9 wherein the bis-cyclopentadienyl) cobalt compound is dicyclopentadienyl cobalt.

11. The process of claim 9 wherein the bis(cyclopentadienyl) cobalt compound is bis(methylcyclopentadienyl) cobalt.

12. A process which comprises contacting 1,3-butadiene with from about 0.1 to about 1.0 weight percent, based on the weight of said butadiene, of a bis(cyclopentadienyl) cobalt compound capable of forming a homogeneous phase with the liquid phse reaction components; at a temperature in the range of from about 180° C. to about 190° C.; and for a period of time sufficient to dimerize said butadiene.

13. The process of claim 12 wherein the bis(cyclopentadienyl) cobalt compound is dicyclopentadienyl cobalt.

14. The process of claim 12 wherein the bis(cyclopentadienyl) cobalt compound is bis(methylcyclopentadienyl) cobalt.

15. A process which comprises contacting a conjugated diene with a dienophile in reactive admixture with from about 0.01 to about 5.0 weight percent, based on the weight of the reactants, of a bis(cyclopentadienyl) cobalt compound capable of forming a homogeneous phase with the liquid phase reaction components; at a temperature in the range of from about −10° C. to about 270° C.; and for a period of time sufficient to produce a Diels-Alder product of said reactants.

16. A process which comprises contacting a conjugated alkadiene having from 4 to 12 carbon atoms with a hydrocarbon dienophile in reactive admixture with from about 0.01 to about 5 weight percent, based on the weight of the reactants, of a bis(cyclopentadienyl) cobalt compound capable of forming a homogeneous phase with the liquid phase reaction components; at a temperature in the range of from about 100° C. to about 195° C.; and for a period of time sufficient to produce a Diels-Alder product of said reactants.

17. The process of claim 16 wherein the conjugated alkadiene is 1,3-butadiene.

18. A process which comprises contacting 1,3-butadiene with a hydrocarbon dienophile in reactive admixture with from about 0.1 to about 1.0 weight percent, based on the weight of the reactants, of a bis(cyclopentadienyl) cobalt compound; capable of forming a homogeneous phase with the liquid phase reaction components; at a temperature in the range of from about 180° C. to about 190° C.; and for a period of time sufficient to produce a Diels-Alder product of said reactants.

19. The process of claim 18 wherein the hydrocarbon dienophile is styrene.

20. The process of claim 18 wherein the hydrocarbon dienophile is dicyclopentadiene.

21. A process which comprises contacting a conjugated diene with from about 0.5 to about 25 weight percent, based on the weight of said conjugated diene, of a compound selected from the group consisting of cyclopentadienyl nickel compounds and cyclopentadienyl cobalt compounds, said compounds being capable of forming a homogeneous phase with the liquid phase reaction components; at a temperature of from about 100° C. to about 220° C.; and for a period of time sufficient to produce a 1,2-divinylcyclobutane product.

22. The process of claim 21 wherein the temperature is in the range of from about 130° C. to about 170° C.

23. A process which comprises contacting a conjugated alkadiene having from 4 to 12 carbon atoms with from about 0.5 to about 25 weight percent, based on the weight of said conjugated diene, of a compound selected from the group consisting of cyclopentadienyl nickel compounds and cyclopentadienyl cobalt compounds, said compounds being capable of forming a homogeneous phase with the liquid phase reaction components; at a temperature of from about 100° C. to about 220° C.; and for a period of time sufficient to produce a 1,2-divinylcyclobutane product.

24. The process of claim 23 wherein the temperature is in the range of from about 130° C. to about 170° C.

25. A process which comprises contacting 1,3-butadiene with from about 0.5 to about 25 weight percent, based on the weight of the 1,3-butadiene, of dicyclopentadienyl nickel, at a temperature of from about 100° C. to about 220° C.; and for a period of time sufficient to produce 1,2-divinylcyclobutane.

26. The process of claim 25 wherein the temperature is in the range of from about 130° C. to about 170° C.

27. A process which comprises contacting 1,3-butadiene with from about 0.5 to about 25 weight percent, based on the weight of the 1,3-butadiene, of cyclopentadienyl nickel nitrosyl at a temperature of from about 100° C. to about 220° C.; and for a period of time sufficient to produce 1,2-divinylcyclobutane.

28. The process of claim 27 wherein the temperature is in the range of from about 130° C. to about 170° C.

29. A process which comprises contacting 1,3-butadiene with from about 0.5 to about 25 weight percent, based on the weight of the 1,3-butadiene, of cyclopentadienyl cobalt 1,3-butadiene at a temperature of from about 100° C. to about 220° C.; and for a period of time sufficient to produce 1,2-divinylcyclobutane.

30. The process of claim 29 wherein the temperature is in the range of from about 130° C. to about 170° C.

31. A process for conducting a Diels-Alder reaction which comprises providing an inhibitor in said reaction selected from the group consisting of a nickel compound having substituted thereon a radical selected from the group consisting of a cyclopentadienyl radical, alkylcyclopentadienyl radical, arylcyclopentadienyl radical and mixtures thereof, and a cobalt compound having substituted thereon a radical selected from the group consisting of cyclopentadienyl, alkylcyclopentadienyl, arylcyclopentadienyl and mixtures thereof.

32. A process for conducting a Diels-Alder reaction which comprises providing an inhibitor in said reaction selected from the group consisting of bis(cyclopentadienyl) cobalt, bis(alkylcyclopentadienyl) cobalt, bis(arylcyclopentadienyl) cobalt and mixtures thereof.

33. A process for conducting a Diels-Alder reaction which comprises providing an inhibitor in said reaction selected from the group consisting of bis(cyclopentadienyl) nickel, bis(alkylcyclopentadienyl) nickel, bis(arylcyclopentadienyl) nickel and mixtures thereof.

References Cited by the Examiner

UNITED STATES PATENTS

| | | | |
|---|---|---|---|
| 2,425,842 | 8/47 | Seyfried et al. | 260—666.5 |
| 2,680,756 | 6/54 | Paulson | 260—439 |

FOREIGN PATENTS 785,760  11/57  Great Britain.

OTHER REFERENCES

"The Diene Synthesis," K. Alder, Newer Methods of Preparation Organic Chemistry, page 404, Interscience Pub. Co., New York, 1948.

Furukawa et al., Chem. Abstracts, vol. 53, column 8, 692f, 1959.

ALPHONSO D. SULLIVAN, *Primary Examiner.*